US008453245B2

(12) United States Patent
Rogers et al.

(10) Patent No.: US 8,453,245 B2
(45) Date of Patent: May 28, 2013

(54) AUTOMATIC VULNERABILITY DETECTION AND RESPONSE

(75) Inventors: Justin Rogers, Redmond, WA (US);
Eric M. Lawrence, Redmond, WA (US);
Henry F. Bridge, New York, NY (US)

(73) Assignee: Microsoft Corporation, Redmond, WA (US)

( * ) Notice: Subject to any disclaimer, the term of this patent is extended or adjusted under 35 U.S.C. 154(b) by 1049 days.

(21) Appl. No.: 11/618,470

(22) Filed: Dec. 29, 2006

(65) Prior Publication Data

US 2008/0163374 A1    Jul. 3, 2008

(51) Int. Cl.
*G06F 11/00* (2006.01)
(52) U.S. Cl.
USPC .................................. 726/25; 713/2
(58) Field of Classification Search
USPC .............................................. 726/25
See application file for complete search history.

(56) References Cited

U.S. PATENT DOCUMENTS

| 6,629,267 | B1 * | 9/2003 | Glerum et al. ................. 714/38 |
| 6,675,295 | B1 * | 1/2004 | Marcelais et al. ............... 713/2 |
| 6,874,084 | B1 | 3/2005 | Dobner et al. |
| 7,437,764 | B1 * | 10/2008 | Sobel et al. .................... 726/25 |
| 2002/0124172 | A1 | 9/2002 | Manahan |
| 2002/0184491 | A1 | 12/2002 | Morgan et al. |
| 2003/0028762 | A1 | 2/2003 | Trilli et al. |
| 2004/0205421 | A1 | 10/2004 | Glerum et al. |
| 2005/0268100 | A1 | 12/2005 | Gasparini et al. |
| 2006/0053293 | A1 | 3/2006 | Zager et al. |
| 2006/0156380 | A1 | 7/2006 | Gladstone et al. |
| 2006/0218403 | A1 | 9/2006 | Sauve et al. |
| 2006/0288420 | A1 * | 12/2006 | Mantripragada et al. ....... 726/25 |

FOREIGN PATENT DOCUMENTS

| AU | 2007341952 | 1/2012 |
| CN | 1821975 | 8/2006 |
| JP | 04033105 | 2/1992 |
| JP | 2006127422 | 5/2006 |
| JP | 2006228206 | 8/2006 |
| WO | WO02075547 | 9/2002 |
| WO | WO2005024630 | 3/2005 |

OTHER PUBLICATIONS

Verisign Inc., "Licensing verisign certificates: securing multiple web server and domain configurations", www.msctrustgate.com/pdf/licensing.pdf, white paper,(2001).

Herzberg, Amir et al., "Protecting valve web users, or preventing spoofing and establishing credential sites", www.cs.bu.ac.il/~herzea/papers/ecommerce/trusted_credentials_area.pdf, Bar Ilan University,(Jul. 2004).

(Continued)

*Primary Examiner* — Amare F Tabor
(74) *Attorney, Agent, or Firm* — Wolfe-SBMC (57) ABSTRACT

Various embodiments detect security vulnerabilities and, responsively, can modify an affected program so that even if an exploit runs, the program's integrity can be maintained. In at least some embodiments, a local automatic vulnerability detection and response (AVD/R) component executes on a user's local machine to detect and mitigate potential vulnerabilities through the use of a shield; and, a remote automatic vulnerability detection and response (AVD/R) component executes to report perceived vulnerabilities so that one or more shields can be delivered and applied locally to mitigate perceived vulnerabilities.

14 Claims, 6 Drawing Sheets

OTHER PUBLICATIONS

Ncipher Inc., "Protecting commercial secure web servers from key-finding treats", www.ncipher.com/uploads/resources/pcws.pdf, white paper,(1999).
International Search Report for International Application No. PCT/US2007/089221 Mailed on Jun. 2, 2008, pp. 12.
"Foreign Office Action", Chinese Application No. 200780048625.3, (Nov. 24, 2010),13 pages.
"Foreign Office Action", Australian Application No. 2007341952, (Jun. 24, 2011), 2 pages.
"Foreign Office Action", Chinese Application No. 200780048625.3, (Jul. 6, 2011), 8 pages.
"Foreign Office Action", Japanese Application No. 2009-544323, (Feb. 10, 2012), 6 pages.
"Foreign Office Action", Chinese Application No. 200780048625.3, (Apr. 12, 2012),6 pages.
"Foreign Office Action", Japanese Application No. 2009-544323, (Jul. 13, 2012), 4 pages.
"Extended European Search Report", European Patent Application No. 07870139.8, (Jul. 20, 2012), 6 pages.
"Foreign Office Action", Chinese Application No. 200780048625.3, (Oct. 31, 2012), 9 pages.

* cited by examiner

Fig. 6

AUTOMATIC VULNERABILITY DETECTION AND RESPONSE

BACKGROUND

Many methods of mitigating software security vulnerabilities are reactive and quite time intensive. That is, once a vulnerability is discovered, software companies typically release a patch some time later directed to preventing attackers from exploiting the vulnerability. While this strategy has worked well for protecting users in the past, its effectiveness partially requires (1) vulnerability finders to find vulnerabilities before hackers, (2) vulnerability finders to report problems to software companies before they disclose them publicly, and (3) high patch adoption rates, so that if an exploit is developed, adopting users are protected from it.

Unfortunately, recent trends do not bode well for these requirements. Specifically, the rate of 0-day exploits (i.e., exploits that have been released for undisclosed, unfixed security vulnerabilities) has increased, and patch adoption rates continue to be slow. In order to prevent the security landscape from worsening considerably, software makers must find a way to both discover and mitigate vulnerabilities faster.

SUMMARY

Various embodiments detect security vulnerabilities and, responsively, can modify an affected program so that even if an exploit runs, the program's integrity can be maintained.

In at least some embodiments, a local automatic vulnerability detection and response (AVD/R) component executes on a user's local machine to detect and mitigate potential vulnerabilities through the use of a shield; and, a remote automatic vulnerability detection and response (AVD/R) component executes to report perceived vulnerabilities so that one or more shields can be delivered and applied locally to mitigate perceived vulnerabilities.

DETAILED DESCRIPTION

Overview

Various embodiments detect security vulnerabilities and, responsively, can modify an affected program so that even if an exploit runs, the program's integrity can be maintained.

In at least some embodiments, a local automatic vulnerability detection and response (AVD/R) component executes on a user's local machine to detect and mitigate potential vulnerabilities through the use of a shield; and, a remote automatic vulnerability detection and response (AVD/R) component executes to report perceived vulnerabilities so that one or more shields can be delivered and applied locally to mitigate perceived vulnerabilities.

In the discussion that follows, a section entitled "Security Vulnerabilities In General" is provided and describes, very generally, the notion of a security vulnerability and how it can arise. Following this, a section entitled "Local AVD/R" is provided and discusses local solutions to vulnerability detection and response. Following this, a section entitled "Remote AVD/R" is provided and discusses various remote solutions to vulnerability detection. Finally, a section entitled "Using Both Local and Remote AVD/R" is provided and describes how both the local and remote approaches can be applied to provide a continuum of protection.

Security Vulnerabilities In General

Many security vulnerabilities emanate from programming errors. There are many different types of programming errors that can lead to a vulnerability. For example, a common programming error is one that allows for a buffer overflow. In situations like this, a programmer may have allocated a certain amount of space to hold data. An exploiter might figure out that if you provide the program with more data than it expects, and if the programmer did not put the correct checks in place to mitigate or eliminate the possibilities of a buffer overflow, then this excess data can cause an overflow. Using the overflow condition, the exploiter can append data or code to the end of the data received in the buffer and cause an overflow. If the data or code that is appended is executed, it can change the program or modify its functionality in some way. Hence, by virtue of a programming error, a security vulnerability can be exploited.

Often, however, exploitations of a security vulnerability can lead to program crashes. In the example above, the exploitation may make the program look to some random part of memory and start to run code that causes an invalid operation and hence, causes the program to crash.

Hence, from a program crash, one can infer that there is a problem with the program. This problem may be associated with a security vulnerability. That is, program crashes are often a sign of a vulnerability because: (1) many of the same programming errors that cause program crashes are exploitable; (2) exploit development involves a good amount of trial and error—consequently, during the early stages of exploit development, failed attempts will cause the program to crash; and (3) exploits often only work on specific versions of a program, and will sometimes crash other versions.

Local AVD/R

Figure 1:
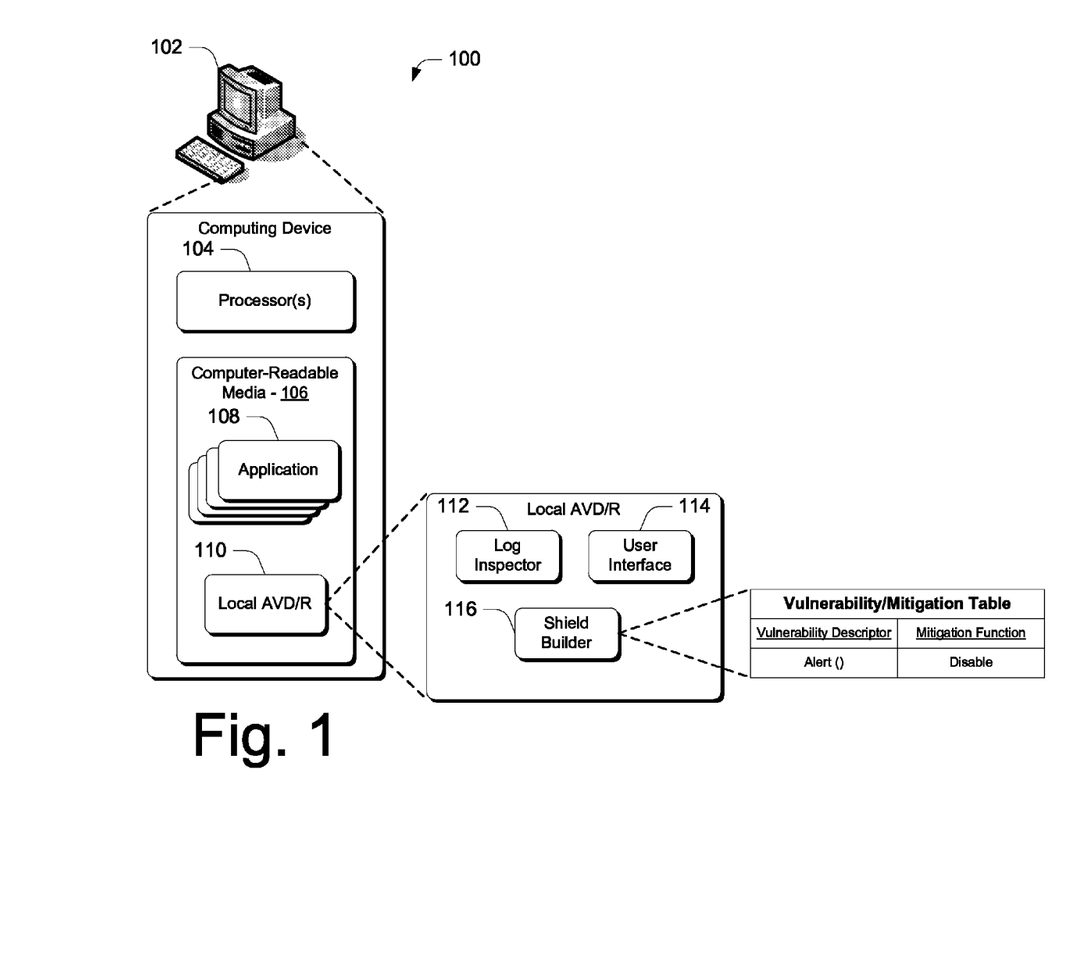
FIG. 1 illustrates a system in accordance with one embodiment.

FIG. 1 illustrates a system in accordance with one embodiment, generally at 100. System 100 includes a computing device 102 having one or more processors 104, one or more computer-readable media 106 and one or more applications 108 that reside on the computer-readable media and which are executable by the processor(s). In addition, computing device 102 includes a local AVD/R component 110 which, in this example, is implemented in software.

Although computing device 102 is illustrated in the form of a desktop computer, it is to be appreciated and understood that other computing devices can be utilized without departing from the spirit and scope of the claimed subject matter. For example, other computing devices can include, by way of example and not limitation, portable computers, handheld computers such as personal digital assistants (PDAs), cell phones and the like.

In this example, local AVD/R component 110 includes a log inspector 112, a user interface component 114 and a shield builder 116. In operation, when a program on the local computing device crashes, information associated with the crash is entered into a crash log, as will be appreciated by the skilled artisan. Typically a crash log contains information that describes parameters associated with a particular crash. For example, the crash log can contain information that describes the program that crashed, which function or interface within the program crashed, and/or any parameters associated with the function or interface that caused the crash. Local AVD/R component 110's log inspector 112 can monitor for crashes and, when one occurs, can automatically inspect the crash log for information associated with the crash. This can include ascertaining which function or interface is associated with the crash. Once the log inspector has ascertained the cause of the crash, it can employ shield builder 116 to build a shield that effectively provides an automatic runtime solution which disables the function or interface. This fact can then be reported to the user via user interface 114.

As an example, consider the following. Assume that the user is using their browser application and a function Alert ( ) crashes. Responsive to the crash, the crash log is updated with information that pertains to the crash, such as the name of the function that crashed and where it crashed. Using this information, log inspector 112 can employ shield builder 116 to build a shield that automatically disables the Alert ( ) function. In one or more embodiments, the shield builder can maintain a vulnerability/mitigation table, such as the one shown in the figure. Here, the vulnerability/mitigation table includes a column that lists vulnerability descriptors and a column that lists mitigation functions. The vulnerability descriptors describe the particular function or interface that is the subject of a mitigation function. The mitigation functions describe the particular mitigation functions that are being employed. In the example above, when a crash occurs, the shield builder makes an entry in the vulnerability/mitigation table and adds "Alert ( )" in the vulnerability descriptor column. In addition, the shield builder adds "Disable" to the corresponding row in the mitigation function column. This tells the application—in this case, the user's browser—that the Alert ( ) function has been disabled.

In addition, in at least some embodiments, this fact is reported to the user via the user interface component 114. Using the corresponding user interface, the user can effectively select to turn this function back on. Hence, in this embodiment, the potential presence of a vulnerability is detected and the corresponding function or interface is selectively disabled thus preventing future exploits.

Figure 2:
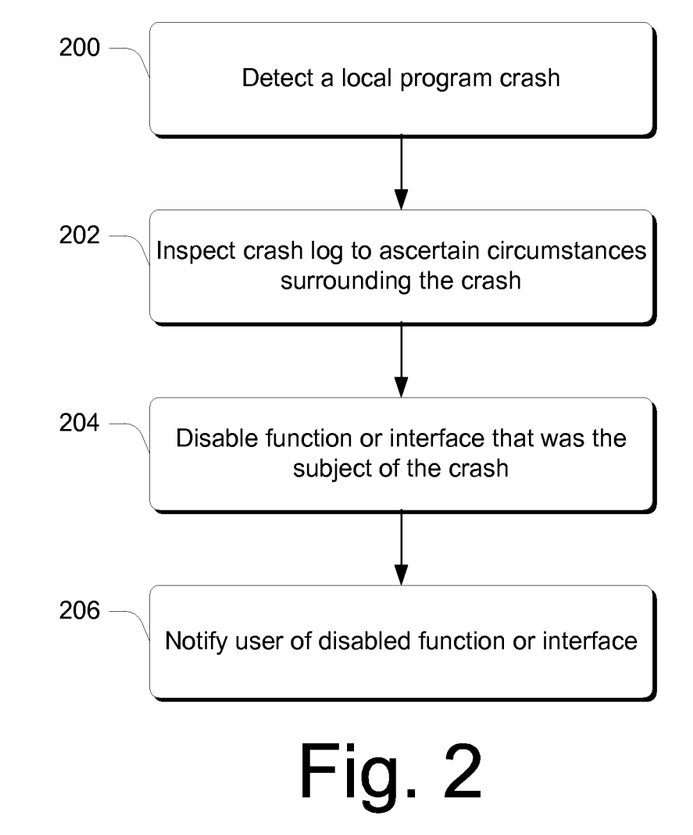
FIG. 2 is a flow diagram that describes steps in a method in accordance with one embodiment.

FIG. 2 is a flow diagram that describes steps in a method in accordance with one embodiment. The method can be implemented in connection with any suitable hardware, software, firmware or combination thereof. In one or more embodiments, the method can be implemented in connection with a system, such as the one shown and described in FIG. 1. Other systems can be utilized without departing from the spirit and scope of the claimed subject matter.

Step 200 detects a local program crash. Examples of how this can be done are given above. Step 202 inspects a crash log to ascertain circumstances surrounding the crash. Step 204 disables a function or interface that was the subject of the crash. Examples of how can be done are provided above. Step 206 notifies a user of the disabled function or interface.

Remote AVD/R

In one or more embodiments, information associated with a program crash can be used remotely. Specifically, when a crash occurs, this information can be remotely reported for further analysis. Such analysis can include, by way of example and not limitation, analyzing the source of the crash and various associated parameters, as well as evaluating such crashes across multiple users to ascertain whether there is a pattern associated with the crash. If a vulnerability is detected, a corresponding shield can be built and provided to users for protecting against exploitations that seek to exploit the vulnerability.

Figure 3:
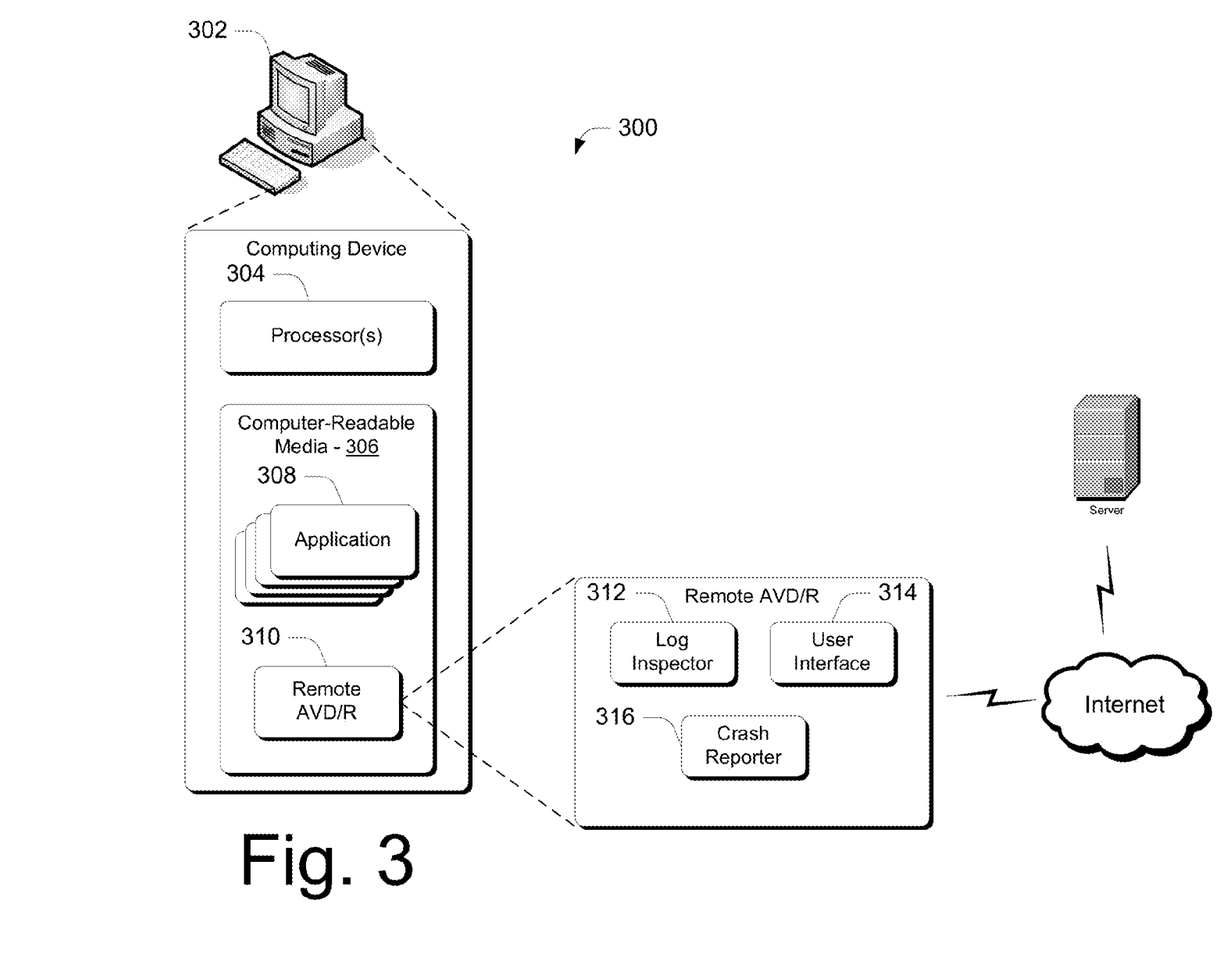
FIG. 3 illustrates a system in accordance with one embodiment.

As an example, consider FIG. 3. There, a system is illustrated in accordance with one embodiment, generally at 300. System 300 includes a computing device 302 having one or more processors 304, one or more computer-readable media 306 and one or more applications 308 that reside on the computer-readable media and which are executable by the processor(s). In addition, computing device 302 includes a remote AVD/R component 310 which, in this example, is implemented in software.

Although computing device 302 is illustrated in the form of a desktop computer, it is to be appreciated and understood that other computing devices can be utilized without departing from the spirit and scope of the claimed subject matter. For example, other computing devices can include, by way of example and not limitation, portable computers, handheld computers such as personal digital assistants (PDAs), cell phones and the like.

In this example, remote AVD/R component 310 includes a log inspector 312, a user interface component 314 and a crash reporter component 316. In operation, when a program on the local computing device crashes, information associated with the crash is entered into a crash log, as described above. Remote AVD/R component 310's log inspector 312 can monitor for crashes and, when one occurs, can automatically inspect the crash log for information associated with the crash. This can include ascertaining which function or interface is associated with the crash. Once the log inspector has ascertained the cause of the crash, the remote AVD/R component can, via user interface 314, ask the user if the user wishes to report the crash to a remote server for further analysis. If the user chooses to report the crash information, the information is aggregated and analyzed by the server. In at least some embodiments, analysis of the crash information can include employing human experts to analyze and ascertain whether any exploitations have been employed.

In an event that analysis of the crash log(s) indicates that a vulnerability has been exploited, one or more shields, such as those described above, can be developed and employed, as by being downloaded and applied locally. In one or more embodiments, user interface 314 can provide the user with an option to re-enable the function or interface that was or is disabled.

Figure 4:
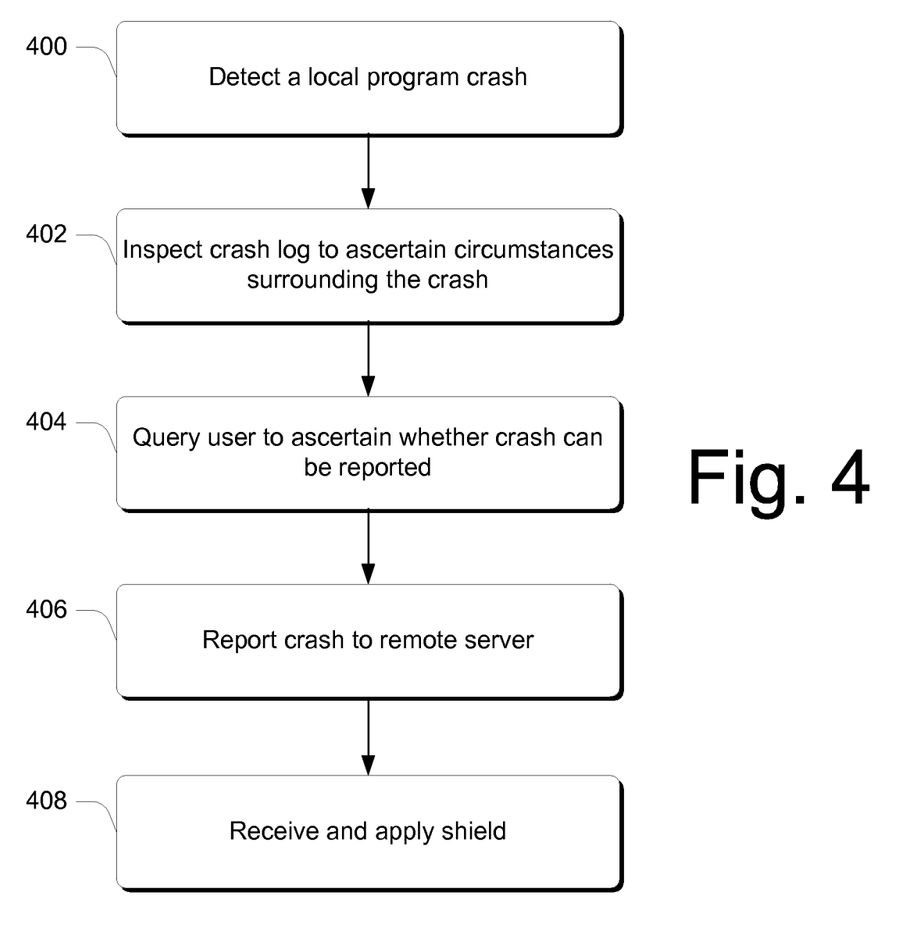
FIG. 4 is a flow diagram that describes steps in a method in accordance with one embodiment.

FIG. 4 is a flow diagram that describes steps in a method in accordance with one embodiment. The method can be implemented in connection with any suitable hardware, software, firmware or combination thereof. In one or more embodiments, the method can be implemented in connection with a system, such as the one shown and described in FIG. 3. Other systems can be utilized without departing from the spirit and scope of the claimed subject matter.

Step 400 detects a local program crash. Examples of how this can be done are given above. Step 402 inspects a crash log to ascertain circumstances surrounding the crash. Step 404 queries a user to ascertain whether the crash can be reported. Step 406 reports the crash to a remote server in the event the user has given authorization. Step 408 receives and implements a shield which effectively disables a function or interface that was the subject of the crash. The shield can be received by downloading it over a network, such as the Internet. As part of this step, the user interface can be utilized to give the user an option to disable the function or interface, or to re-enable the function or interface. Examples of how this can be done are provided above.

Using Both Local and Remote AVD/R

In one or more embodiments, information associated with a program crash can be used both locally and remotely. Specifically, when a crash occurs, this information can be used locally to disable the affected function or interface by applying a shield. In addition, this information can be used remotely to conduct analysis as described above. Such analysis can include, by way of example and not limitation, analyzing the source of the crash and various associated parameters, as well as evaluating such crashes across multiple users to ascertain whether there is a pattern associated with the crash. If a vulnerability is detected, a corresponding shield can be built and provided to users for protecting against any exploitations that seek to exploit the vulnerability.

Figure 5:
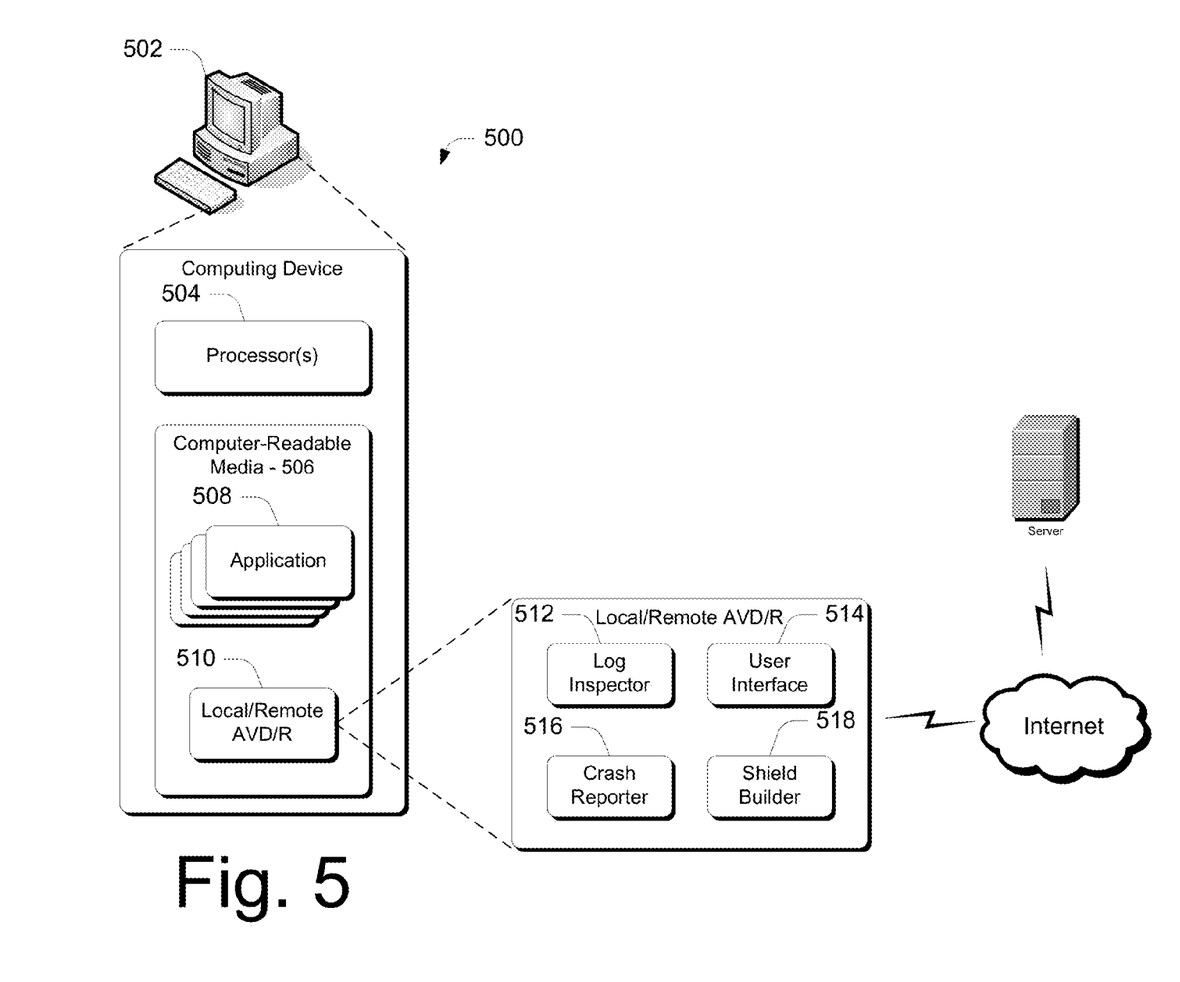
FIG. 5 illustrates a system in accordance with one embodiment.

As an example, consider FIG. 5. There, a system is illustrated in accordance with one embodiment, generally at 500. System 500 includes a computing device 502 having one or more processors 504, one or more computer-readable media 506 and one or more applications 508 that reside on the computer-readable media and which are executable by the processor(s). In addition, computing device 502 includes a local/remote AVD/R component 510 which, in this example, is implemented in software.

Although computing device 502 is illustrated in the form of a desktop computer, it is to be appreciated and understood that other computing devices can be utilized without departing from the spirit and scope of the claimed subject matter. For example, other computing devices can include, by way of example and not limitation, portable computers, handheld computers such as personal digital assistants (PDAs), cell phones and the like.

In this example, local/remote AVD/R component 510 includes a log inspector 512, a user interface component 514, a reporter component 516 and a shield builder 518. In operation, when a program on the local computing device crashes, information associated with the crash is entered into a crash log, as described above. Local/remote AVD/R component 510's log inspector 512 can monitor for crashes and, when one occurs, can automatically inspect the crash log for information associated with the crash. This can include ascertaining which function or interface is associated with the crash. Once the log inspector has ascertained the cause of the crash, the local/remote AVD/R component can apply a shield locally, as described above, to disable the function or interface that is associated with the crash. This can also be reported to the user via the user interface component 514 which can also allow the user to re-enable the function or interface that has been disabled.

In addition, in one or more embodiments, the local/remote AVD/R component can, via user interface 514, ask the user if the user wishes to report the crash to a remote server for further analysis. If the user chooses to report the crash information, the information is aggregated and analyzed by the server. In at least some embodiments, analysis of the crash information can include employing human experts to analyze and ascertain whether any exploitations have been employed.

In an event that analysis of the crash log(s) indicates that a vulnerability has been exploited, one or more shields, such as those described above, can be developed and employed, as by being downloaded and applied on a local machine. In one or more embodiments, user interface 514 can provide the user with an option to re-enable the function or interface that was or is disabled.

Figure 6:
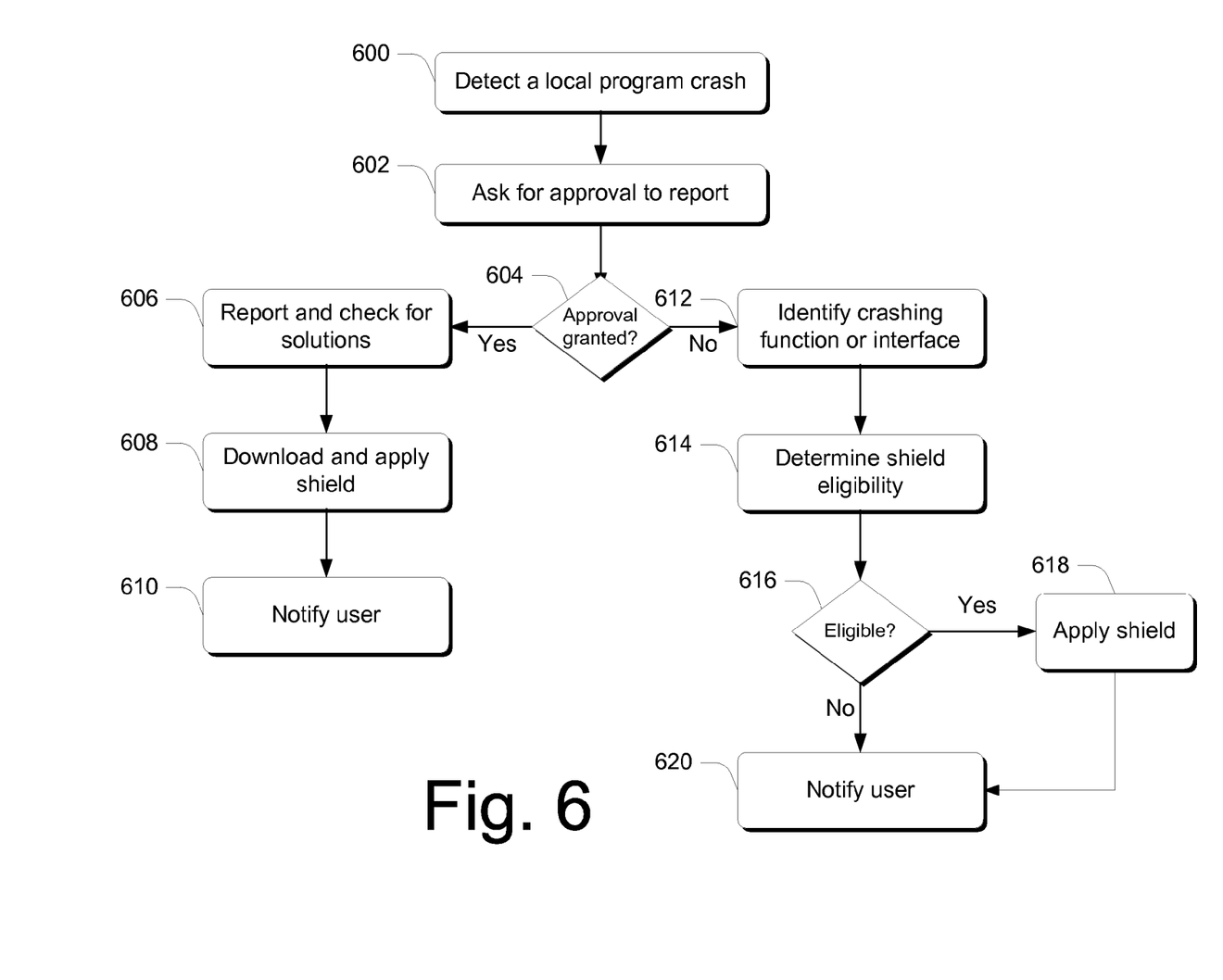
FIG. 6 is a flow diagram that describes steps in a method in accordance with one embodiment.

FIG. 6 is a flow diagram that describes steps in a method in accordance with one embodiment. The method can be implemented in connection with any suitable hardware, software, firmware or combination thereof. In one or more embodiments, the method can be implemented in connection with a system, such as the one shown and described in FIG. 6. Other systems can be utilized without departing from the spirit and scope of the claimed subject matter.

Step 600 detects a local program crash and step 602 asks the user for approval to report the crash to a remote server. If user approval is granted, at step 604, then step 606 ascertains the cause of the crash, reports the crash to the remote server and checks for any solutions that might be available for the crash. By reporting the crash to the remote server, analysis of the crash and for any associated patterns across multiple users can be conducted. Analysis can include both automatic, machine analysis and human analysis. Step 608 then downloads and applies any relevant shields locally and step 610 notifies the user.

If, on the other hand, approval is not granted at step 604, step 612 identifies the crashing function or interface and step 614 determines shield eligibility. If step 616 determines that there is an eligible local shield to address the problem, step 618 applies the shield as described above and step 620 notifies the user. If, on the other hand, there is no eligible shield, step 620 notifies the user.

The above-described embodiments can be implemented in connection with any suitable application, and can comprise part of the application, or a separate component that is utilized by the application. For example, in one or more embodiments, the functionality described above can be implemented as part of a web browser, instant messaging application or any other suitable application or software component or system. For example, the functionality can be implemented as part of an operating system.

In one or more embodiments, one or more so-called reputation services can be employed to further enhance security. Specifically, a reputation service or third party service can broadly monitor for security exploitations and report any perceived or actual vulnerabilities to the appropriate authorities. For example, a reputation service may detect that there is a security vulnerability associated with a particular function associated with a particular web page. Once detected, the reputation service can then report the vulnerability to the appropriate company, such as Microsoft, and/or cause shields to be selectively downloaded or otherwise made available to various users to address the perceived vulnerability.

Conclusion

Various embodiments detect security vulnerabilities and, responsively, can modify an affected program so that even if an exploit runs, the program's integrity can be maintained. In at least some embodiments, a local automatic vulnerability detection and response (AVD/R) component executes on a user's local machine to detect and mitigate potential vulnerabilities through the use of a shield; and, a remote automatic vulnerability detection and response (AVD/R) component executes to report perceived vulnerabilities so that one or more shields can be delivered and applied locally to mitigate perceived vulnerabilities.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
   detecting on a computing device a local program crash, wherein said detecting is done by a component residing outside of the program;

responsive to said detecting, disabling a function or interface of the local program that was a subject of the program crash by building and applying a shield that provides an automatic, runtime solution to disable the function or interface as the program continues to operate;

informing the local program that the function or interface has been disabled by the shield;

notifying a user that the function or interface has been disabled by the shield; and providing the user, via a user interface, with an option to re-enable the function or interface that has been disabled by the shield.

2. The method of claim 1 further comprising after said detecting and prior to said disabling, inspecting a crash log to ascertain the function or interface associated with the program crash.

3. The method of claim 1, wherein the acts of building and applying are performed by using a vulnerability/mitigation table which associates vulnerabilities and mitigation functions.

4. The method of claim 1, wherein said acts of detecting and disabling are performed by a web browser.

5. One or more computer-readable storage media devices having computer readable instructions thereon, comprising:

instructions for detecting on a computing device a local program crash, wherein said detecting is done by a component residing outside of the program;

responsive to said instructions for detecting, instructions for disabling a function or interface of the local program that was a subject of the program crash by building and applying a shield that provides an automatic, runtime solution to disable the function or interface as the program continues to operate;

instructions for informing the local program that the function or interface has been disabled by the shield;

instructions for notifying a user that the function or interface has been disabled the shield; and instructions for providing the user, via a user interface, with an option to re-enable the function or interface that has been disabled by the shield.

6. A computing system having a processor and a memory implementing the steps of:

detecting on a computing device a local program crash, wherein said detecting is done by a component residing outside of the program;

responsive to said detecting, disabling a function or interface of the local program that was a subject of the program crash by building and applying a shield that provides an automatic, runtime solution to disable the function or interface as the program continues to operate;

informing the local program that the function or interface has been disabled by the shield;

notifying a user that the function or interface has been disabled the shield; and providing the user, via a user interface, with an option to re-enable the function or interface that has been disabled by the shield.

7. A computer-implemented method comprising:

detecting on a computing device a local program crash, wherein said detecting is done by a component residing outside of the program;

responsive to said detecting, querying a user to ascertain whether the program crash can be reported;

reporting the local program crash;

responsive to said reporting, receiving and applying a shield as an automatic, runtime solution effective to disable a function or interface of the local program that was a subject of the program crash and allow the local program to continue operating;

notifying a user that the function or interface has been disabled by the shield; and providing the user, via a user interface, with an option to re-enable the function or interface that has been disabled by the shield.

8. The method of claim 7, wherein the act of applying is performed by using a vulnerability/mitigation table which associates vulnerabilities and mitigation functions.

9. The method of claim 7 further comprising responsive to said detecting, inspecting a crash log to ascertain the function or interface associated with the program crash.

10. The method of claim 7, wherein said acts of detecting, querying, reporting, receiving and applying are performed by a web browser.

11. One or more computer-readable storage media devices having computer readable instructions thereon, comprising:

instructions for detecting on a computing device a local program crash, wherein said detecting is done by a component residing outside of the program;

responsive to said instructions for detecting, instructions for querying a user to ascertain whether the program crash can be reported;

instructions for reporting the local program crash;

responsive to said reporting, instructions for receiving and applying a shield as an automatic, runtime solution effective to disable a function or interface of the local program that was a subject of the program crash and allow the local program to continue operating;

instructions for notifying a user that the function or interface has been disabled the shield; and instructions for providing the user, via a user interface, with an option to re-enable the function or interface that has been disabled by the shield.

12. A computing system having a processor and a memory implementing the steps of:

detecting on a computing device a local program crash, wherein said detecting is done by a component residing outside of the program;

responsive to said detecting, for querying a user to ascertain whether the program crash can be reported;

reporting the local program crash;

responsive to said reporting, receiving and applying a shield as an automatic, runtime solution effective to disable a function or interface of the local program that was a subject of the program crash and allow the local program to continue operating;

notifying a user that the function or interface has been disabled theshield; and providing the user, via a user interface, with an option to re-enable the function or interface that has been disabled by the shield.

13. A computer-implemented method comprising:

detecting on a computing device a local program crash, wherein said detecting is done by a component residing outside of the program;

asking a user for approval to report the crash to a remote server;

if user approval is granted:

reporting the crash to the remote server;

responsive to said reporting, downloading one or more shields configured to disable a function or interface of the local program associated with the crash to provide an automatic, runtime solution;

applying the one or more shields to disable the function or interface;

if user approval is not granted, disabling the function or interface that was a subject of the program crash;

informing the local program that the function or interface has been disabled; and providing the user, via a user interface, with an option to re-enable the function or interface that has been disabled.

14. The method of claim 13, wherein the acts of detecting and asking are performed by a web browser.

* * * * *

UNITED STATES PATENT AND TRADEMARK OFFICE
CERTIFICATE OF CORRECTION

PATENT NO. : 8,453,245 B2  Page 1 of 1
APPLICATION NO. : 11/618470
DATED : May 28, 2013
INVENTOR(S) : Justin E. Rogers It is certified that error appears in the above-identified patent and that said Letters Patent is hereby corrected as shown below:

In the Claims:

In column 7, line 40, in claim 5, after "disabled" insert -- by --, therefor.

In column 7, line 58, in claim 6, after "disabled" insert -- by --, therefor.

In column 8, line 36, in claim 11, after "disabled" insert -- by --, therefor.

In column 8, line 54, in claim 12, after "disabled" insert -- by --, therefor.

In column 8, line 54, in claim 12, delete "theshield" and insert -- the shield --, therefor.

Signed and Sealed this
Sixteenth Day of July, 2013

Teresa Stanek Rea
*Acting Director of the United States Patent and Trademark Office*